United States Patent [19]

Murphy et al.

[11] Patent Number: 4,590,027

[45] Date of Patent: May 20, 1986

[54] METHOD OF PRODUCING A THERMOPLASTICS MATERIAL

[76] Inventors: David J. Murphy, 17, Guildford Road West; Leslie N. Phillips, 22, Carlyon Close, both of Farnborough, Hampshire, England

[21] Appl. No.: 611,380

[22] Filed: May 17, 1984

Related U.S. Application Data

[63] Continuation of Ser. No. 297,331, Aug. 28, 1981, abandoned, which is a continuation of Ser. No. 44,115, May 3, 1979, which is a continuation of Ser. No. 803,938, Jun. 6, 1977.

[30] Foreign Application Priority Data

Jun. 10, 1976 [GB] United Kingdom ............... 24167/76
Oct. 22, 1976 [GB] United Kingdom ............... 44068/76

[51] Int. Cl.$^4$ ............................................. B29C 43/20
[52] U.S. Cl. .................................. 264/135; 264/136; 264/258
[58] Field of Search ............... 264/258, 134, 135, 136, 264/137; 428/236, 239, 245, 246, 247, 261, 268, 301, 302, 288, 289, 290, 286, 287, 911, 902

[56] References Cited

U.S. PATENT DOCUMENTS 3,790,432 2/1974 Fletcher et al. .................... 264/136

FOREIGN PATENT DOCUMENTS 1310350 3/1973 United Kingdom ............... 428/419

OTHER PUBLICATIONS

May: "Low Cost Manufacturing of Composites" (1975), Technical Paper of the Society of Manufacturing Engineers, EM75-103.
Phillips: "Fabrication of Reinforced Thermoplastics by Means of the Film-Stacking Technique," Royal Aircraft Establishment, Farnborough, Hants, U.K., pp. 101-107.

*Primary Examiner*—Donald Czaja
*Assistant Examiner*—V. Fischbach
*Attorney, Agent, or Firm*—Cushman Darby & Cushman

[57] ABSTRACT

A method is described of producing a laminated structural material which includes the steps of stacking alternately layers of thermoplastics sheet material and one or more layers of material to be laminated, the material having been impregnated with a second thermoplastics material prior to stacking, placing the stack in a preheated mould or press and subjecting the stack to heat and pressure for a time sufficient to cause the thermoplastics material to flow and bond together the layers of structural material to be laminated and allowing the mould or press to cool sufficiently to avoid distortion of the moulded part before removal from the mould or press.

17 Claims, No Drawings

METHOD OF PRODUCING A THERMOPLASTICS MATERIAL

CROSS-REFERENCE TO RELATED APPLICATIONS

This is a continuation of application Ser. No. 297,331, filed Aug. 28, 1981, now abandoned, which is a continuation of our earlier application Ser. No. 44,115, filed May 30, 1979, which in turn is a continuation of our earlier application Ser. No. 803,938 filed June 6, 1977, both of which are now abandoned.

The present invention is concerned with methods for the production of moulded structural laminated materials, and with the materials produced.

In this specification the term laminated is used to describe materials in which one or more layers of discontinuous material, for example a woven or nonwoven fibre, is bonded with a thermoplastics material.

There are two classes of plastics materials; thermoplastics materials which soften and eventually melt on heating but which resolidify on cooling; and thermosetting materials which harden when heated to an appropriate temperature initially, but which are not affected by further heating unless the temperature is high enough to decompose the thermoset material. The present invention is concerned with thermoplastic resins.

In accordance with the present invention a method of producing a laminated structural material includes the steps of first stacking alternately layers of a thermoplastics sheet material and one or more layers of material to be laminated, the material to be laminated having been impregnated with a second thermoplastics material prior to stacking, placing the stack in a pre-heated mould or press and subjecting the stack to heat and pressure for an appreciable time (as hereinafter defined) sufficient to cause the thermoplastics material to flow and bond together the layers of material to be laminated, and allowing the mould or press to cool sufficiently to avoid distortion of the moulded part before removal from the press.

It is normal practice when moulding thermoplastics materials to cut off heat and to open the mould, thereby removing the moulding pressure, almost as soon as the pre-determined temperature and pressure are reached to maximise utilising of the costly mould. The time may be two minutes or less, as described in U.K. Pat. No. 909,379.

In the context of the present specification the term "appreciable time" means a period of time longer than that normally employed in moulding thermoplastics and is generally at least 10 minutes and is preferably 30 minutes.

It may be necessary to use more than one layer of thermoplastics sheet material between each pair of layers to be impregnated to ensure that a sufficient amount of thermoplastics material is present. It is contemplated that normally the outer layers will be of thermoplastics materials but a final decorative or protective outer layer may be applied either during the initial bonding or at a later stage.

The material to be laminated is a fibrous discontinuous material capable of being impregnated with resin, for example, fabric, woven or nonwoven, or a felt, or paper.

Thermoplastic materials suitable for use in the process of the present invention include cellulose acetate, cellulose acetate-butyrate, ethyl cellulose, polystyrene, vinylchloride/vinylacetate copolymer, polypropylene, polyethylene, polycarbonate, polyamides (ie nylons), polyesters, polysulphone, polyethersulphone and polyimide. Such materials may be used either in sheet form as the first thermoplastics material or as the second thermoplastics material impregnated in the layers of material to be laminated. It will of course be realised that the first and second plastics materials may be the same and that individual layers of the first or second thermoplastics material may be different.

The fibrous material may be carbon fibres, glass fibres, asbestos fibres or other fibres, for example aramid fibres, in the particular forms recited herein.

In an alternative aspect of the present invention the layers or sheets of material to be laminated are enclosed in pockets of lay flat thermoplastics film tube and the thermoplastics film/materiel/thermoplastics film sandwiches are stacked and moulded as indicated above. In this case different thicknesses of thermoplastics material may be required to achieve similar results to those achieved with single films of material.

The laminated structural material may be produced in its final form, or alternatively the initially produced laminate may be held as stock and moulded again to a desired shape for final use. It has been discovered that if the reinforcing material is carbon fibres in a form capable of providing a continuous conducting path through the laminate heating may be by passing current through the laminate to heat and soften it.

In a particular feature of the present invention the material to be laminated is a discontinuous material capable of being impregnated with thermoplastic resin and is so impregnated before the laminating process hereinbefore described.

Suitable material for the practice of this feature of the invention include felts and in particular woven fabrics in which the warp and weft threads are multi-filament, for example carbon fibre cloth or tape, or hybrid glass fibre/carbon fibre cloth or tape.

The present invention is particularly advantageous when producing structural laminates from resins which are not particularly soluble in solvents conventionally used in impregnation so that only relatively low solids pick-ups can be achieved. Employment of the present invention can lead to the reduction or possibly substantial elimination of an unacceptably high proportion of voids in reinforced structural thermoplastics using such resins. If the impregnating resin and the thermoplastics film are of the same material it is possible to obtain substantially void free structural laminates of thermoplastics resins which cannot readily be achieved by other means. For example polyethersulphone reinforced by carbon fibres.

In an aspect of this feature of the invention the impregnating resin and the thermoplastics film material are different.

By this aspect structural laminates may be tailored for particular purposes. For example if the thermoplastics material of the outer layer of the laminate has a relatively low softening point hot-welding of pieces of laminate is facilitated also the outer layer can be chosen to facilitate welding; cellulose acetate-butyrate is such a material. Stepped half-lap welded joints may be facilitated by having outer layers of relatively high softening point and internal contacting (in the joint) layers of relatively low softening point. When pressed in a heated mould such a material softens and bonds internally before the outer layer softens sufficiently to become tacky.

The immediately foregoing arrangement is also advantageous in hotforming processes where the inner layers soften before the outer layers soften to the extent of becoming tacky or sticky.

The thermoplastics film material and the impregnating resins suitable for use in this particular feature of the present invention are as set forth above and of those materials cellulose acetate, cellulose acetatebutyrate and ethyl cellulose may be classified as rendering solvent welding easier; polystyrene, vinyl chloride/vinylacetate copolymer, polypropylene and polyethylene may be classified as having relatively lower softening temperatures; and polyamides (nylons), polysulphone, polyethersulphone, and polyimide may be classified as having relatively higher softening temperatures, although it will of course be recognised that softening temperatures of individual members of these classes will vary.

The advantages in such material in joining and moulding processes will be readily apparent.

The invention will now be illustrated by the following examples:

EXAMPLE 1

Unidirectional Type II carbon fibre tape was impregnated with a 7.5% by weight solution of polysulphone (P.1700 grade supplied by Union Carbide) in dichloromethane and the solvent allowed to evaporate so that the carbon fibre took up 20% by weight of resin. Eight impregnated layers of carbon fibre tape, with the carbon fibres oriented in the same direction were then interleaved with 0.076 mm thick film of polysulphone, with polysulphone layers on the outside and placed in a mould. The mould was placed in a press heated to 325° C. with contact pressure for 5 minutes, at the end of which time full pressure of either 6 MPa or 4 MPa was applied. After a total time in the press of 35 mins the heat was turned off and the press allowed to cool before removing the composite.

The process was carried out with surface-treated and with untreated carbon fibres and the composites prepared were tested for mechanical properties. Flexural strength, interlaminar shear strength, tensile strength and Izod impact strength were determined on samples produced at 6 MPa; flexural modulus was determined instead of Izod impact strength on samples produced at 4 MPa.

The results are given in Table 1 below and each value is the mean of ten determinations, the coefficient of variation is given for each result and the volume fraction was determined by disolving the resin out in a Soxhlet extractor with dimethyl formamide as solvent.

TABLE 1

|  |  | MOULDING PRESSURE 6 MPa | | | MOULDING PRESSURE 4 MPa | | |
|---|---|---|---|---|---|---|---|
|  |  | Value | Coefficient of Variation | $V_f$ | Value | Coefficient of Variation | $V_f$ |
| Flexural Strength (MPa) | treated fibre | 1443 | 4.1% | 0.56 | 1256 | 9.6% | 0.56 |
|  | untreated fibre | 1311 | 4.6% | 0.58 | 1147 | 3.9% | 0.54 |
| Interlaminar Shear Strength (MPa) | treated fibre | 72.3 | 3.8% | 0.56 | 71.5 | 2.0% | 0.56 |
|  | untreated fibre | 39.7 | 8.9% | 0.58 | 43.2 | 3.4% | 0.54 |
| Tensile Strength (MPa) | treated fibre | 1050 | 3.5% | 0.54 | 1052 | 7.6% | 0.55 |
|  | untreated fibre | 1184 | 3.2% | 0.55 | 1070 | 6.1% | 0.54 |
| Izod Impact Strength KJ/m | notched | 1.7 | — | — | — | — | — |
|  | un-notched | 2.5 | — | — | — | — | — |
| Flexural Modulus (GPa) | treated fibre | — | — | — | 76.5 | — | 0.56 |
|  | untreated fibre | — | — | — | 83.1 | — | 0.54 |

NOTE:
Only the untreated fibre was tested for Izod Impact Strength

EXAMPLE 2

Example 1 was repeated except that polyethersulphone (Grade 200P supplied by ICI) was used instead of polysulphone, and a moulding pressure of 6 MPa was used but not 4 MPa. The same tessts were carried out as were carried out on the material moulded at 6 MPa in Example 1 and the results are given below in Table 2.

TABLE 2

|  |  | MOULDING PRESSURE 6 MPa | | |
|---|---|---|---|---|
|  |  | Value | Coefficient of Variation | $V_f$ |
| Flexural Strength (MPa) | treated fibre | 1108 | 7.6% | 0.56 |
|  | untreated fibre | 1213 | 3.2% | 0.55 |
| Interlaminar Shear Strength (MPa) | treated fibre | 61.2 | 7.7% | 0.59 |
|  | untreated fibre | 40.6 | 8.6% | 0.55 |
| Tensile Strength (MPa) | treated fibre | 947 | 7.6% | 0.60 |
|  | untreated fibre | 1035 | 5.7% | 0.54 |
| Izod Impact Strength KJ/m | notched | 1.8 | — | — |
|  | un-notched | 2.5 | — | — |

NOTE:
Only untreated fibre was tested for Izod Impact Strength.

EXAMPLE 3

The resistance of the composites prepared as described in Examples 1 and 2 to water was tested by boiling in water for 24 hours, the interlaminar shear strength (ILSS) being determined after the composite had been dried of surface water and after it had been dried to constant weight in an oven at 60° C. The ILSS of a control was also determined for comparative purposes. Only the composite cured at a pressure of 6 MPa was tested from Example 1.

The results, each being the mean of 10 determinations, are given below in Table 3.

TABLE 3

|  | Treated Fibre | Untreated Fibre |
|---|---|---|
|  | ILSS (MPa) | ILSS (MPa) |
| Polysulphone Resin |  |  |
| 1. After 24 Hour Water Boil | 61.4 | 37.6 |
| 2. After drying to | 66.7 | 43.5 |

TABLE 3-continued

|   | Treated Fibre ILSS (MPa) | | Untreated Fibre ILSS (MPa) | |
|---|---|---|---|---|
| 3. Control | 68.6 | | 43.2 | |
| Water pick-up | | 0.59% | | 0.52% |
| Strength retention (wet) | | 89.5% | | 87.0% |
| Polyethersulphone Resin | | | | |
| 4. After 24 Hour Water Boil | 43.2 | | 39.0 | |
| 5. After drying to constant weight | 50.1 | | 41.5 | |
| 6. Control | 61.3 | | 40.6 | |
| Water pick-up | | 1.62% | | 1.21% |
| Strength retention | | 70.5% | | 96.1% |

EXAMPLE 4

Carbon fibre cloth having a square weave of ten 5000 fil Type II tows per 10 mm both warp and weft being carbon fibre was cut into pieces 150 mm×127 mm and a 20% by weight solution of polysulphone (P1700 grade supplied by Union Carbide) in methylene dichloride was brushed into six pieces of carbon fibre cloth, which were then air dried at room temperature in a good draught during 2 hours. The resin pick-up was 40% by weight. The impregnated sheets of carbon fibre cloth were stacked between alternate layers of nylon film stacked within two greased aluminium plates and placed between the platens of a press preheated to 210° C. A pressure of 1.38 MPa was applied, the heat being immediately switched off and the laminated material left to cool to 50° C., while the pressure was maintained.

The product was a strong tough laminate having a flexural strength of 250 MPa (35,000 psi).

EXAMPLE 5

A unidirectional carbon cloth consisting of a warp of 5000 fil carbon fibre tows and weft of a fine glass fibre was impregnated with polysulphone resin, stacked between alternate layers of nylon film and heated and compressed as disclosed in Example 4.

The laminate produced had aflexural strength of 453 MPa (66,000 psi).

EXAMPLE 6

A solution of polyethersulphone in dichloromethane (20 g in 220 g of solution) was applied immediately after preparation as a heavy coat on a unidirectional carbon fibre cloth having a glass fibre weft. The cloth, which originally weighed 60 g was dried and found to weigh 80 g.

Two laminates were produced by stacking six layers of the impregnated carbon fibre cloth sections disclosed above and pressing at 4 MPa in a press pre-heated to 240° C. and cooling to 120° C. under pressure before removal from the press.

The first laminate had no interleaved plastics material and had a dull, rough, dry and powdery surface with the glass wefts prominent. It machined poorly.

The second laminate included 0.002" thick film of polyethersulphone between each piece of carbon fibre cloth and on the outer surfaces and was strong, flexural strength 904 MPa (131,000 psi), with an excellent surface appearance. It machined very well.

EXAMPLE 7

A piece of Kevlar fabric (satin weave), as an example of an aramid fibre, weighing 48 grams was impregnated with a solution of polysulphone and allowed to dry giving a weight of 65 grams. This is an insufficient quantity of resin to produce a good laminate because when this material was pressed alone a weak laminate having a poor surface finish characteristic of insufficient matrix resin was obtained.

Eight layers of polysulphone impregnated Kevlar were interleaved with sheets of polysulphone with polysulphone sheet as the outside layer and the stack pressed at 230° C. The composite produced had a good surface finish, and a flexural strength of 548 MPa (37,800 psi).

EXAMPLE 8

A piece of carbon fibre cloth weighing 40 grams was impregnated with polysulphone resin in solution to give a final weight after drying of 60 grams.

A stack was prepared of carbon fibre cloth polysulphone film, Kevlar cloth (as in Example 7), polysulphone film, etc, till six layers of the carbon fibre cloth and five layers of the Kevlar cloth were included; polysulphone film was placed on the outsides and the stack was pressed at 240° C. and allowed to cool to 150° C. before removal from the press.

The product was a strong panel having a good surface finish.

In a similar manner a panel was prepared in which two carbon fibre cloth layers on either side of four Kevlar layers were all interleaved with polysulphone films, there also being polysulphone film on the outsides. This panel also was strong and had good surface properties.

EXAMPLE 9

Unidirectional carbon fibre tape (Type II—untreated) was impregnated with a 7.5% by weight solution of polycarbonate (2800 grade supplied by Bayer UK Ltd) in dichloromethane and the solvent allowed to evaporate. The carbon fibre then contained 16% by weight of polycarbonate resin. Eight layers of impregnated carbon fibre tape were then interleaved alternately with polycarbonate film (0.1 mm thick) with polycarbonate film as the outer layers. The assembly was placed in a mould and then in a press heated to 270° C. with contact pressure for 5 minutes, at the end of which time a pressure of 6 MPa was applied. After a total time in the press of 30 minutes the heating was turned off and the press allowed to cool before removal of the laminate.

The laminate was cut into flexural and interlaminar shear test pieces (six of each) and tested in an Instron machine. The value for flexural strength was 1326 MPa and that for interlaminar shear strength was 53.7 MPa both being the mean of six determinations.

The method described in the present specification may be used to produce a variety of articles and in particular it may be used to produce articles requiring a relatively high proportion of a particular resin at its surface. For example radomes for use on aircraft require to be made of a thermoplastics material which is a good dielectric and which has good rain erosion resistant properties. This may be achieved by the method of the present invention using polycarbonate, polysulphone and polyethersulphone as at least the outer surface.

I claim:

1. A method of producing a substantially void-free and substantially stiff laminated structural material which material includes thermoplastics matrix material and a fibrous reinforcement material in the form of a woven fabric, a non-woven fabric, a felt or a paper, said method consisting essentially of the successive steps of:
   (a) impregnating said fibrous material throughout with a first thermoplastics material which is soluble in a solvent and is applied in a solvent solution, the solvent of said solution being allowed to evaporate after impregnation, the amount of the first thermoplastics material with which the said fibrous material is impregnated being at least sufficient for thorough impregnation of the fibers, but insufficient for the matrix of the desired structural material;
   (b) stacking at least two layers of thus impregnated fibrous material, in alternate sequence with interleaving layers of a second thermoplastic material in sheet form, the amount of the second thermoplastics material included in the stack being such that the total amount of thermoplastics matrix material present in the stack is sufficient to enable the desired substantially stiff laminated structural material to be produced;
   (c) subjecting the thus formed stack to heat and pressure in a preheated mould or press for sufficient time, in excess of 10 minutes, to cause the first and second thermoplastics material to soften and flow and to cause said thermoplastics materials to bond together and to bond to the fibrous material in a substantially void-free manner and to cause the stack to conform to a desired intermediate stock form or final product form, whereby a substantially stiff laminated structural material is produced having a flexural strength of at least 250 MPA; and thereafter
   (d) allowing the mould or press to cool sufficiently to avoid distortion of the laminated structural material thus produced before removal of said laminated structural material from the mould or press.

2. A method as claimed in claim 1, wherein the duration of the heat and pressure step (c) is between 10 and 30 minutes.

3. A method as claimed in claim 2, wherein the duration of the heat and pressure step (c) is about 30 minutes.

4. A method as claimed in claim 1, wherein the first and second thermoplastics material are the same or different and are each selected from the group consisting of cellulose acetate, cellulose acetatebutyrate, ethyl cellulose, polystyrene, vinyl chloride vinyl acetate copolymer, polypropylene, polyethylene, polycarbonate, polyamides, polyesters, polysulphone, polyethersulphone and polyimides.

5. A method as claimed in claim 1, wherein the ordered fibrous material is in the form of a woven or non-woven fabric.

6. A method as claimed in claim 5, wherein the fibers of the ordered fibrous material are selected from the group consisting of carbon fibers, glass fibers, asbestos fibers and aramid fibers.

7. A method as claimed in claim 5, wherein the ordered fibrous material is a woven fabric in which the warp and weft threads are multifilament.

8. A method as claimed in claim 7, wherein the woven fabric is selected from the group consisting of carbon fiber cloth, carbon fiber tape, hybrid glass fiber/carbon fiber cloth and hybrid glass fiber/carbon fiber tape.

9. A method as claimed in claim 1, wherein the thermoplastics material of the outer layers is selected from the group consisting of polycarbonate, polysulphone and polyethersulphone.

10. A method as claimed in claim 1, wherein the fibrous material is impregnated with a weak solvent solution of the first thermoplastics material said solution having a concentration of between about 7.5 percent and about 20 percent by weight of thermoplastics material.

11. A method as claimed in claim 10, wherein said solvent solution has a concentration of about 7.5 percent by weight of thermoplastics material.

12. A method as claimed in claim 1, wherein during the heat and pressure step (c) the stack is heated and pressed in a mould of such a shape as to produce from said stack an article which is suitable for use on an aircraft.

13. A method as claimed in claim 12 wherein during the heat and pressure step the stack is heated and pressed in a mould having a shape of an aircraft radome.

14. A method as claimed in claim 12, wherein said article comprises as its outer surface thermoplastics material selected from the group consisting of polycarbonate, polysulphone and polyethersulphone.

15. A method as claimed in claim 1, wherein the amount of thermoplastics material with which the ordered fibrous material is impregnated is about 20% by weight.

16. A method as claimed in claim 1, wherein the amount of thermoplastics material with which the ordered fibrous material is impregnated is about 16% by weight.

17. A method as claimed in claim 1 wherein the stack incorporates outer covering layers of a thermoplastic material.

* * * * *